United States Patent [19]

Parnell et al.

[11] Patent Number: 5,411,383
[45] Date of Patent: May 2, 1995

[54] ROTOR AND FLEXIBLE DRIVE SHAFT ASSEMBLY

[75] Inventors: Aron T. Parnell, Blackley; Gareth D. Thomas, Hadfield, both of United Kingdom

[73] Assignee: Mono Pumps Limited, Manchester, United Kingdom

[21] Appl. No.: 226,713

[22] Filed: Apr. 12, 1994

[30] Foreign Application Priority Data

Dec. 9, 1993 [GB] United Kingdom ............... 9325248

[51] Int. Cl.⁶ ............................................. F01C 5/00
[52] U.S. Cl. ..................................... 418/48; 403/376
[58] Field of Search ............... 418/48; 403/376, 355, 403/315, 341

[56] References Cited

U.S. PATENT DOCUMENTS

| | | | |
|---|---|---|---|
| 2,924,180 | 2/1960 | Bourke et al. | 418/48 |
| 3,600,113 | 8/1971 | Pahl et al. | 418/48 |
| 4,990,070 | 2/1991 | Maruyama et al. | 418/48 |

FOREIGN PATENT DOCUMENTS

| | | | |
|---|---|---|---|
| 0566144 | 10/1993 | European Pat. Off. | |
| 0210853 | 8/1960 | Germany | 403/355 |
| 1307015 | 2/1973 | United Kingdom | |
| 2049103 | 12/1980 | United Kingdom | |
| 2140126 | 11/1984 | United Kingdom | |

Primary Examiner—Richard A. Bertsch
Assistant Examiner—Charles G. Freay
Attorney, Agent, or Firm—Harness, Dickey & Pierce

[57] ABSTRACT

A rotor and flexible drive shaft assembly for a progressive cavity pump or motor in which the rotor 10 is provided with an end portion 12 and the drive shaft 20 is provided with a head portion 18. A transverse spirally wound sheet metal pin 24 is engaged in the first passage 16 in the end portion 12 and a second passage 22 in the head portion 18, a retaining sleeve 26 preventing the pin from falling out, the retaining sleeve itself being held in place by a circlip 32.

8 Claims, 1 Drawing Sheet

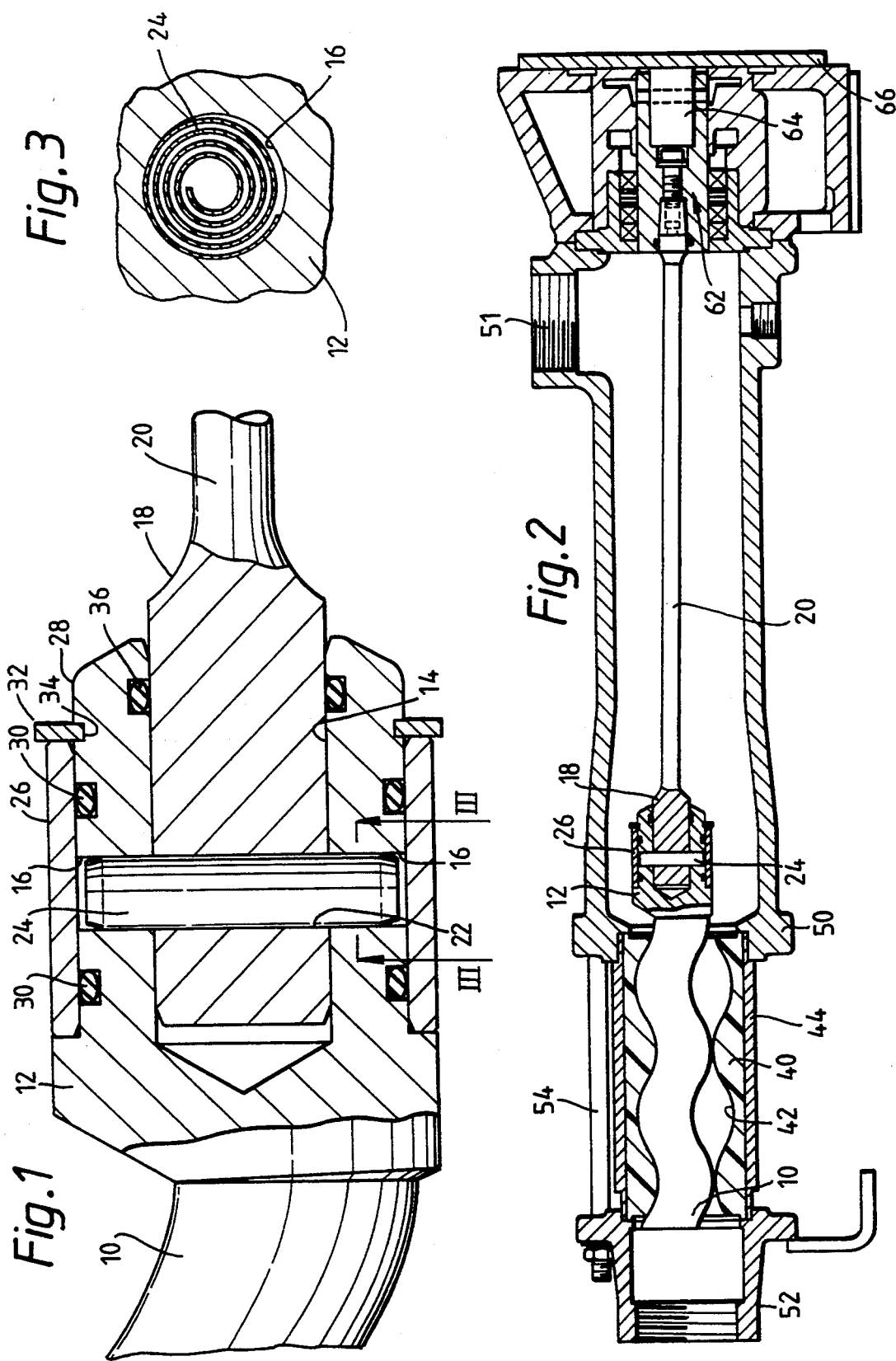

ROTOR AND FLEXIBLE DRIVE SHAFT ASSEMBLY

BACKGROUND OF THE INVENTION

The present invention relates to a rotor and flexible drive shaft assembly for a progressive cavity pump or motor. The invention is particularly concerned with a progressive cavity pump or motor having an outer member, usually a stator, which has female helical gear formation thereon having n starts and a rotor, rotatable within said stator and having a male helical gear formation of the same pitch but with n±1 starts.

In former years the rotor was driven by means of a drive shaft having a universal joint at each end. More recently, however, the rotor is driven by a flexible drive shaft see, for example, GB-A-1220848; GB-A-1285377; GB-A1562277 and GB-A-2244517.

Such a drive arrangement has been very satisfactory. However, the method of connecting the drive shaft to the rotor is somewhat complex and expensive and is not always entirely satisfactory if it is necessary to rotate the drive shaft in either one rotational direction or the other.

SUMMARY OF THE INVENTION

It is an object of the present invention to overcome such disadvantages and according to the invention there is provided a rotor and flexible drive shaft assembly for a progressive cavity pump or motor, said rotor having a rotor body with a helical gear formation thereon, an end portion of said rotor having an axial blind bore therein, a flexible drive shaft, a head portion of said drive shaft engageable in said axial blind bore, a first transverse passage in said head portion of said drive shaft, a second transverse passage in the end portion of said rotor intersecting the blind bore therein, said first and second passages being aligned with one another and being of substantially the same diameter, a pin engaged in said first and second passages, a retaining sleeve surrounding said end portion, at least one sealing ring mounted on said end portion and within said sleeve providing a seal between the retaining sleeve and the end portion of the rotor and means for holding said sleeve on said end portion.

The structure of the invention, it will be appreciated, is very simple and relatively inexpensive to manufacture and is reliable and is capable of being used in either rotational sense.

Because the pump may often be pumping in aggressive fluid, the sleeve preferably has mounted therein at least one, and preferably two sealing rings, one on each side of the pin, thereby providing a seal between the retaining sleeve and the end portion of the rotor. Advantageously also, a sealing ring is provided in the axial bore in the end portion of rotor sealingly engaging the head portion of the drive shaft.

While any number of different means may be used to hold the sleeve on the end portion of the rotor, preferably the holding means comprise a circlip which is easy to fit and release and is relatively inexpensive.

The pin is preferably a spirally wound sheet metal pin, which is wound to have a sprung out diameter providing an interference fit with the first and second passages. Such a structure is strong and is yet capable of preventing any sliding movement of the pin in the first and second passages. Furthermore, it is capable of preventing any unnecessary slackness between the pin and the first and second passages thereby significantly reducing wear.

BRIEF DESCRIPTION OF THE DRAWINGS

In order that the present invention may more readily be understood, the following description is given, merely by way of example, reference being made to the accompanying drawing in which:

FIG. 1 is a schematic side elevation of one embodiment of rotor and flexible drive shaft assembly according to the invention; and FIG. 2 is a cross-section through a progressive cavity pump employing such a rotor and flexible drive shaft assembly.

BRIEF DESCRIPTION OF THE PREFERRED EMBODIMENTS

On the left hand side of FIG. 1 there is illustrated a part of the body 10 of a rotor for a progressive cavity pump or motor, this rotor having a male helical gear formation thereon which cooperates with a female helical gear formation 42 (FIG. 2) of the stator 40. The rotor body 10 having a helical gear formation thereon is provided with an integral end portion 12 which is enlarged and has an axial bore 14 therein provided with two aligned parts of a first transverse passage 16.

Closely fitted into the axial bore 14 is a head portion 18 of a flexible drive shaft 20. This head portion 18 has formed in it transversely extending second passage 22 and the head portion 18 may be fitted into the bore 14 in such a way that the second passage 22 is aligned with the two parts of the first passage 16. The first and second passages 16,22 have substantially the same diameter.

Fitted into the first and second bore 16,22 is a pin 24 which is a spirally wound sheet metal pin, (see FIG. 3) wound to have a sprung out diameter providing an interference fit with the first and second passages 16,22. This interference fit ensures no relative movement between the pin and either the head portion 18 of the drive shaft 20, or the end portion 12 of the rotor 10.

In order positively to secure the pin in place, a retaining sleeve 26 having an internal diameter substantially equal to a machined-down part 28 of the end portion 12 of the rotor, is slipped over this machined-down portion 28.

Two sealing rings 30 are provided, one to the left and one to the right of the first passage 16 as shown in the drawing.

A holding means for the retaining sleeve 26 is provided by a circlip 32 engaged in a suitable groove 34 on the machined-down surface 28.

Finally a further annular seal 36 is provided in an end part of the end portion 12 and seals against the head portion 18 of the drive shaft 20.

It will be appreciated that such a structure is relatively simple to mount and dismount should one either need to fit a new rotor or a new drive shaft, it only being necessary to remove the circlip 32 and then the retaining sleeve 26, thereafter forcing out the pin 24 with a suitable drift. Reassembly is equally easy.

Because of the structure of the assembly, there will be little or no relative movement between the drive shaft and the rotor and the seals provide a security against any of the pumped fluid attacking the parts of the connection thus provided.

By way of clarification FIG. 2 illustrates a whole pump employing the rotor and flexible drive shaft assembly shown in FIG. 1. The stator 40 having a helical gear formation 42 is illustrated surrounded by a tubular body member 44 which is shown secured between a conventional inlet casing 50 and an outlet casing 52, these being held together by elongate bolts 54.

Rotatable within the bore 42 of the stator 40 is the rotor 10 of FIG. 1 to which is connected the flexible drive shaft 20, which in turn is connected by a further connection 62 to the armature shaft 64 of a motor, the end plate of which is illustrated at 66.

The flexible drive shaft 20 is rotatable within the casing 50 and is surrounded by the material being pumped, this entering via an inlet passage 51. It would be appreciated, therefore, that the provision of the seals does indeed give the above mentioned security against any of the pump material attacking the parts of the connection thus provided.

We claim:

1. A rotor and flexible drive shaft assembly for a progressive cavity pump or motor, said rotor comprising a rotor body with a helical gear formation thereon, an end portion of said rotor having an axial blind bore in said end portion, a flexible drive shaft, a head portion of said drive shaft closely engageable in said axial blind bore, two aligned parts of a first transverse through passage in the end portion of said rotor intersecting the blind bore therein, a second transverse through passage in said head portion of said drive shaft, said first and second passages being aligned with one another and being of substantially the same diameter, a pin engaged in said first and second passages, a retaining sleeve surrounding said end portion, at least one sealing ring mounted on said end portion and within said sleeve effective to provide a seal portion and within said sleeve effective to provide a seal between the retaining sleeve and the end portion of the rotor and means for holding said sleeve on said end portion.

2. An assembly as claimed in claim 1, and further comprising a sealing ring in the axial bore in the end portion of the rotor sealingly engaging the head portion of the drive shaft.

3. An assembly as claimed in 1, wherein said holding means comprises a circlip.

4. An assembly as claimed in claim 1, wherein said pin is a spirally wound sheet metal pin, wound effective to have a sprung out diameter providing an interference fit with said first and second passages.

5. A progressive cavity pump or motor comprising a stator having a bore with a female helical gear formation therein, having n starts, a rotor rotatable within said stator and having a male helical gear formation therein, having n±1 starts rotatable within said stator, said rotor comprising a rotor body with a helical gear formation thereon, an end portion of said rotor having an axial blind bore in said end portion, a flexible drive shaft, a head portion of said drive shaft closely engaged in said axial blind bore, two aligned parts of a first transverse through passage in the end portion of said rotor intersecting the blind bore therein, a second transverse through passage in said head portion of said drive shaft, said first and second passages being aligned with one another and being of substantially the same diameter, a pin engaged in said first and second passages, a retaining sleeve surrounding said end portion, at least one sealing ring mounted on said end portion and within said sleeve effective to provide a seal between the retaining sleeve and the end portion of the rotor and means for holding said sleeve on said end portion.

6. A progressive cavity pump or motor as claimed in claim 5, and further comprising a sealing ring in the axial bore in the end portion of the rotor sealingly engaging the head portion of the drive shaft.

7. A progressive cavity pump or motor as claimed in claim 5, wherein said holding means comprises a circlip.

8. A progressive cavity pump or motor as claimed in claim 5, wherein said pin is a spirally wound sheet metal pin, wound effective to have a sprung out diameter providing an interference fit with said first and second passages.

* * * * *

UNITED STATES PATENT AND TRADEMARK OFFICE
CERTIFICATE OF CORRECTION

PATENT NO. : 5,411,383
DATED : May 2, 1995
INVENTOR(S) : Parnell, et al

It is certified that error appears in the above-indentified patent and that said Letters Patent is hereby corrected as shown below:

On the Title Page Under Attorney, Agent, or Firm, "Harness, Dickey & Pierce" should be --Harness, Dickey & Pierce, P.L.C.--.

Column 1, line 54, "portion-of" should be --portion of--.

Column 2, line 15, insert --Figure 3 is a cross-section taken along the line III-III of Figure 1.--.

Column 2, line 16, "BRIEF" should be --DETAILED--.

Signed and Sealed this

Fourth Day of July, 1995

Attest:

BRUCE LEHMAN

*Attesting Officer*   *Commissioner of Patents and Trademarks*